(12) United States Patent
Mangold

(10) Patent No.: US 10,774,818 B1
(45) Date of Patent: Sep. 15, 2020

(54) IMPACT ACCELERATION DEVICE

(71) Applicant: Jonathan Mangold, Richmond, VA (US)

(72) Inventor: Jonathan Mangold, Richmond, VA (US)

( * ) Notice: Subject to any disclaimer, the term of this patent is extended or adjusted under 35 U.S.C. 154(b) by 168 days.

(21) Appl. No.: 15/846,160

(22) Filed: Dec. 18, 2017

Related U.S. Application Data

(63) Continuation-in-part of application No. 14/973,668, filed on Dec. 17, 2015, now Pat. No. 9,845,793, which is a continuation-in-part of application No. 13/781,753, filed on Mar. 1, 2013, now abandoned.

(51) Int. Cl.
*F03G 3/00* (2006.01)
*F16F 15/31* (2006.01)
*B60K 8/00* (2006.01)
*B64D 27/24* (2006.01)

(52) U.S. Cl.
CPC ............... *F03G 3/00* (2013.01); *F16F 15/31* (2013.01); *B60K 8/00* (2013.01); *B64D 27/24* (2013.01)

(58) Field of Classification Search
CPC ... F03G 3/00; F16F 15/31; B60K 8/00; B64D 27/24
See application file for complete search history.

(56) References Cited

U.S. PATENT DOCUMENTS

| | | | | | |
|---|---|---|---|---|---|
| 2,636,340 | A | * | 4/1953 | Mendez | F02B 41/00 60/721 |
| 3,810,394 | A | * | 5/1974 | Novak | B06B 1/16 74/87 |
| 4,238,968 | A | * | 12/1980 | Cook | F03G 3/00 74/84 R |
| 4,770,063 | A | * | 9/1988 | Mundo | F03G 3/00 74/61 |
| 5,557,988 | A | * | 9/1996 | Claxton | B64G 1/28 244/164 |
| 5,685,196 | A | * | 11/1997 | Foster, Sr. | F03G 3/00 180/7.1 |

(Continued)

FOREIGN PATENT DOCUMENTS

GB 2426315 A 11/2006

*Primary Examiner* — David M Fenstermacher
(74) *Attorney, Agent, or Firm* — Thedford I. Hitaffer; Hitaffer & Hitaffer, PLLC

(57) ABSTRACT

A vehicle uses a plurality of momentum generators to accelerate. The momentum generator may comprise an arm bearing weights that may be mounted to a frame and arranged to pivot in circular motion. A power source rotates the arm which encounters a stop before rotating half of a full turn. The power source may act continually on the arm, with the arm being released to rotate by a detent mechanism. Momentum of the arm and weights is transferred by the stop to the frame. Direction of rotation is selected to move the frame in a predetermined direction. The vehicle may be wheeled or may be flight capable. If flight capable, the vehicle may have a primary power source such as a rocket motor, with the momentum generators being disposed to increase velocity beyond that produced by the rocket motor. Momentum generators are preferably provided in pairs arranged in mirror image opposition so that operation does not impose unbalanced forces on the vehicle.

11 Claims, 9 Drawing Sheets

(56) References Cited

U.S. PATENT DOCUMENTS 5,966,986 A * 10/1999 Laul .................... F03G 3/00
244/171.5
8,434,379 B2 * 5/2013 Romano ............... F03G 3/00
74/84 S
8,863,597 B2 * 10/2014 Plews .................. F03G 3/00
74/84 S

* cited by examiner

IMPACT ACCELERATION DEVICE

CROSS-REFERENCE TO RELATED APPLICATIONS

This application is a continuation-in-part of U.S. patent application Ser. No. 14/973,668, filed Dec. 17, 2015, issued as U.S. Pat. No. 9,845,793, on Dec. 19, 2017, which is a continuation-in-part of U.S. patent application Ser. No. 13/781,753, filed Mar. 1, 2013, abandoned, the disclosures of which is incorporated herein by reference in their entirety.

BACKGROUND OF THE INVENTION

This invention relates in general to powered vehicles, and more particularly, to vehicles wherein momentum devices provide either the sole power or supplementary power for motion.

Powered vehicles have traditionally had combustion based or electric rotary motors. This holds true for both surface transportation vehicles, such as automobiles and boats, and for aircraft. While traditional power plants are operable, there is a need to increase velocity beyond that attainable by traditional power plants.

SUMMARY OF THE INVENTION

This invention relates to a momentum based thrust or acceleration type device. The acceleration type device is of the type that rotates about an axis and transfers its momentum to an associated vehicle upon striking an interference member. The acceleration type device comprises a pair of arms that is rotatably fixed in relation to the vehicle, and is accelerated under the influence of a power source. The power source may be a hydraulic power source that imposes force against the arms, to cause the arms to accelerate in a circular motion and strike the interference member. As an alternative, the power source may comprise a motor, such as an electric motor, or other suitable source, including but not limited to a spring force. Transfer of momentum from the rotating arms to the vehicle through the interference members will then propel the vehicle into motion.

Preferably, such arms are provided in pairs, with arms disposed in mirror opposition to one another, and impact the interference members at a forward angle that is about 120 degrees from an initial position, and in relation to each other. This arrangement reduces unbalanced forces that could otherwise be imposed on the vehicle.

The device may be secondary arms connected to primary arms at a pivot so as to transfer further momentum to the interference members.

The vehicle may be a wheeled ground vehicle, a boat, an aircraft, or some other movable vehicle.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

Figure 1:
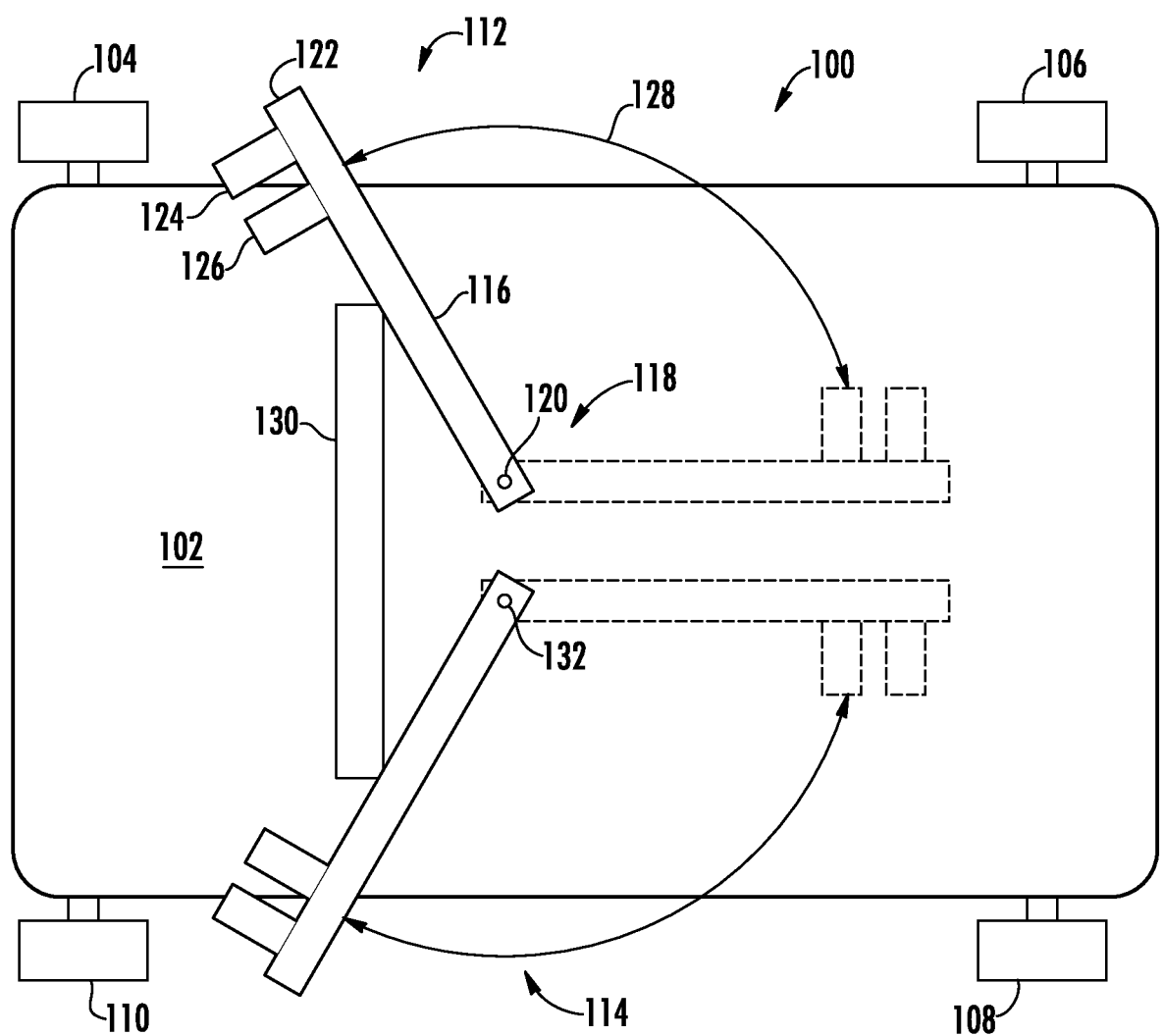
FIG. 1 is a diagrammatic top plan view of an exemplary vehicle with an acceleration type device according to at least one aspect of the invention.

Referring now to the drawings, there is illustrated in FIG. 1 an exemplary device for demonstration purposes. This device is capable of moving and being accelerated according to principles of the invention. The device illustrated in FIG. 1 is used in connection with a wheeled vehicle 100 comprising a frame 102 supported by a plurality of wheels 104, 106, 108, 110, and two impact generators 112, 114. It should be understood that the wheels 104, 106, 108, 110 are mounted for rotation on suitable axles (shown but not referenced) enabling the wheels 104, 106, 108, 110 to rotate in a manner enabling the wheeled vehicle 100 to roll in a conventional manner along a supporting surface (not shown). The impact generators 112, 114 generate momentum that is transferred to the frame 102 to cause the wheeled vehicle 100 to roll, as will be described herein below. The direction of motion of the wheeled vehicle 100 would be in a direction to the left when viewing FIG. 1.

It should be noted at this point that orientation terms are with reference to the drawings, and could obviously change with changes in the position or orientation of the device. The drawing figures depict their subject matter in orientations of normal use, which could obviously change with changes in device position or orientation. Therefore, orientation terms should be understood to provide semantic basis for purposes of this description, and are not intended to limit the invention or its component parts in any particular way.

As shown in the drawings, the frame 102 may be comprised of a relatively flat or planer platform. Regardless of its actual configuration, which may vary from the flat platform shown, the frame 102 will be understood to provide a structural element or support to which other components of the wheeled vehicle 100 may be sturdily mounted and suitably supported to perform as described herein.

It should be understood that the wheeled vehicle 100 illustrated is a relatively small-scale vehicle intended for purposes of demonstration. The wheeled vehicle 100 may be sufficiently small as to be hand held or carried readily by hand by an ordinary person. Of course, as will be explained hereinafter, devices that utilize the novel principles may be built to greater scale, and may also have supplementary propulsive power plants of power sources, as will become apparent in the description that follows.

In a device, such as the one with the wheeled vehicle 100 shown, the impact generators 112, 114 may be disposed to rotate through a plane that is substantially parallel to the frame or environmental surface. Of course, other orientations of rotation and/or impact are possible.

Figure 2:
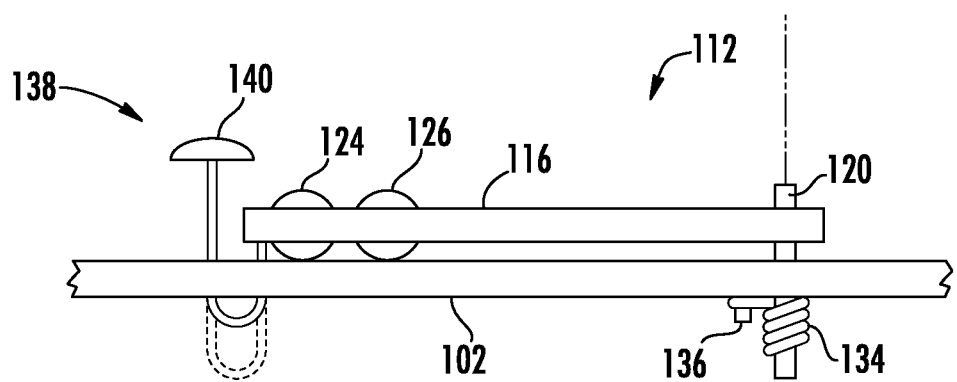
FIG. 2 is a diagrammatic side elevational detail view of a portion of the vehicle shown in FIG. 1.

The basic principle of operation of the impact generators 112, 114 is as follows. The impact generator 112 comprises an arm 116 having a proximal end 118 that is mounted to the frame 102 in a manner enabling the arm 116 to rotate about an axis, the axis being represented by a pivot, such as an axle 120. The actual axis is represented in FIG. 2 by a broken projection line (shown but not referenced). It should be understood that the axle 120, shown only in end view in FIG. 1, may be suitably journaled within the frame 102 to enable operation as described herein. The arm 116 may have a distal end 122, which may be weighted, such as by having at least one weight affixed thereto. As illustrated, two weights 124, 126 are provided, and are mounted on the arm 116 not literally at the very end, but rather proximate the distal end 122. It should be appreciated that weight may be carried or otherwise supported at or proximate the distal end 122 of the arm 116. Although two weights 124, 126 are shown, any number of weights may be employed. It would also be possible to fashion the arm 116 from a material of sufficient mass or distribution of mass such that discrete weights, such as the weights 124, 126, are not necessary.

The impact generator 112 is shown in an initial position in broken lines in FIG. 1. When allowed to rotate about the axle 120, the arm 116 will rotate into a final position shown in solid lines. An arrow 128 indicates swing or limited rotation of the arm 116. As depicted, swing or limited rotation may encompass an angle of 120 degrees between the initial and final positions of the arm 116. It will be understood that swing or rotation is limited in the final position by a stop 130, which intercepts and interferes with the arm 116 as the arm 116 rotates from the initial position to the final position. The stop 130 is solidly fixed to the frame 102. Preferably, and although not shown, a limiting or restraining structure is provided to limit rotation of the arm 116 (to the right when viewing FIG. 1) as indicated by the arrow 128 beyond the initial position (shown in broken lines).

When the arm 116 rotates from the initial position to the final position, the stop 130 arrests rotational movement of the impact generator 112 about the axis represented by the axle 120, and transfers momentum from the formerly moving impact generator 112 to the frame 102. The frame 102 and hence, the entire wheeled vehicle 100 accelerate along a path of travel responsively to this transfer of momentum.

As shown in FIG. 1, the impact generator 114 has a similar construction to the impact generator 112, but is oriented in mirror image opposition. It should be clearly understood that the impact generators 112, 114 are disposed in pairs, each of which rotates about its respective axis, such as that provided by the axle 120, in a direction opposite the direction of the other impact generator of the pair.

As clearly illustrated, the arms 116 move in opposing directions in relation to one another, and the forces thereof are in equal and opposite directions. The arms 116 move out and around in a circular motion and impact the stop 130. In the preferred embodiment, the arms 116 rotate to a final position, at a forward angle of about 120 degrees in relation to each other. The transfer of momentum on impact with the stop 130 results in forward acceleration, in the forward direction of the impact of the arms 116. The device will maintain a constant velocity with each successive impact.

Referring now to FIG. 2, and using the impact generator 112 illustratively representing both of the impact generators 112 and 114, the power source may comprise a spring, such as a coil spring 134, which may be wound about the axle 120. The coil spring 134 may be anchored at one end, such as by passing one end thereof through a hole (not visible in FIG. 2) formed in the axle 120, and at the other end by a finger 136 that may restrain the other end of the coil spring 134 against escape from an operable position. For example, the finger 136 may be sturdily fixed to the frame 102.

The type of power source represented by the coil spring 134 applies force to the arm 116, urges the arm 116 to rotate in the direction shown by the arrow 128 in FIG. 1. The arm 116 may be inhibited from rotation by a suitable release feature that, when operated, is disposed to free the arm 116 and hence, its associated impact generator 112, to rotate about its respective axis (represented by the axle 120) responsive to the force applied by the coil spring 134.

An exemplary release is shown diagrammatically in FIG. 2. A U-shaped member 138 may in an initial position (shown in solid lines), projecting into engagement with the arm 116 and preventing the arm 116 from rotating. When the U-shaped member 138 is depressed (downwardly, from above, when viewing FIG. 2), and is thus forced into a released position (shown in broken lines), the U-shaped member 138 disengages from the arm 116, which the arm 116 is thus released to rotate responsively to spring force provided by the coil spring 134. The U-shaped member 138, which will be understood to be suitably mounted to and supported by the frame 102, may have an enlarged head 140 to facilitate engagement by the hand of a human user (not shown).

Figure 3:
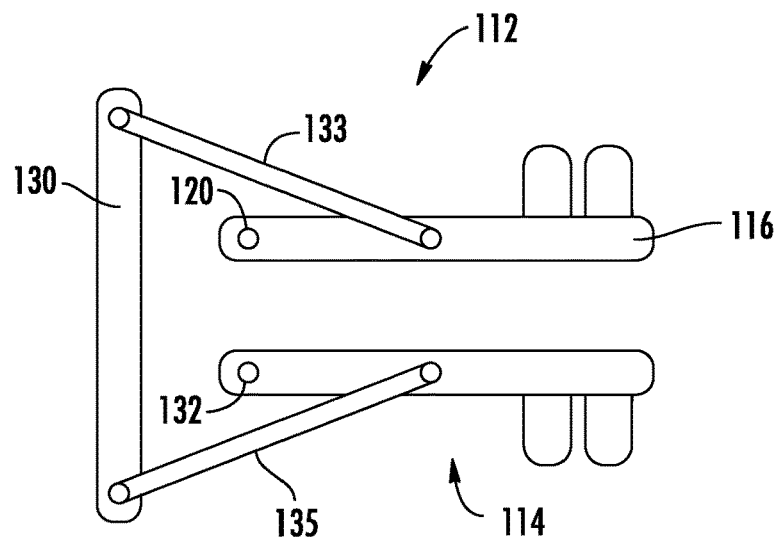
FIG. 3 is a diagrammatic top plan view of another example of a device according to another aspect of the invention in an initial or cocked position.
Figure 4:
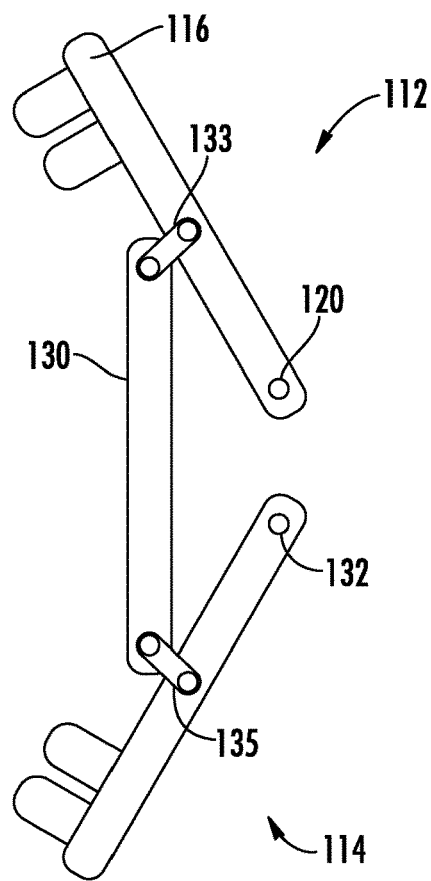
FIG. 4 is a diagrammatic top plan view of the device shown in FIG. 3 in a final or fired position.

Any suitable power source may be used to rotate the impact generators 112, 114. For example, as shown in FIGS. 3 and 4, in a small-scale vehicle, the impact generators 112, 114 may rotate about their respective axes represented by axles 120, 132 responsively to one or more elastic bands 133, 135 (e.g., rubber bands), which may be stretched between the arm 116 of each impact generator 112, 114 and some point fixed in relation to the frame 102 to cause the arms 116 to rotate from the initial position, shown in FIG. 3, toward the stop 130 so as to strike the stop 130, shown in FIG. 4.

Figure 5:
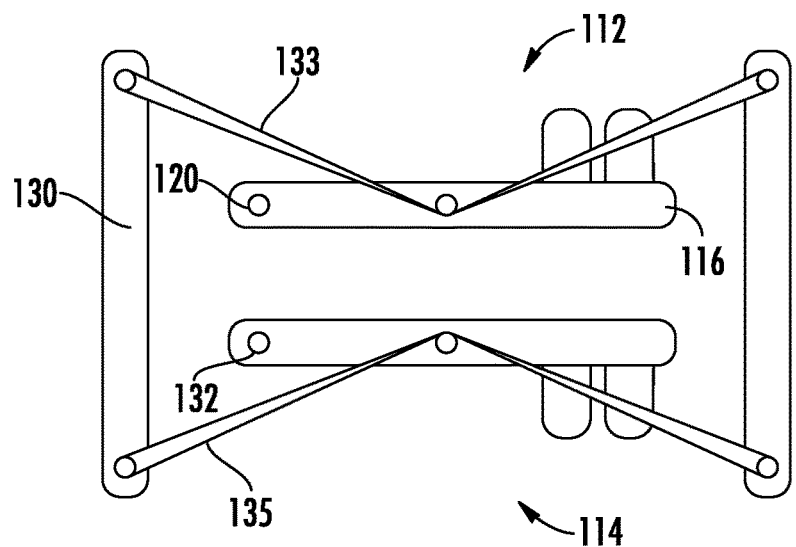
FIG. 5 is a diagrammatic top plan view of another example of another device according to yet another aspect of the invention in an initial or cocked position.
Figure 6:
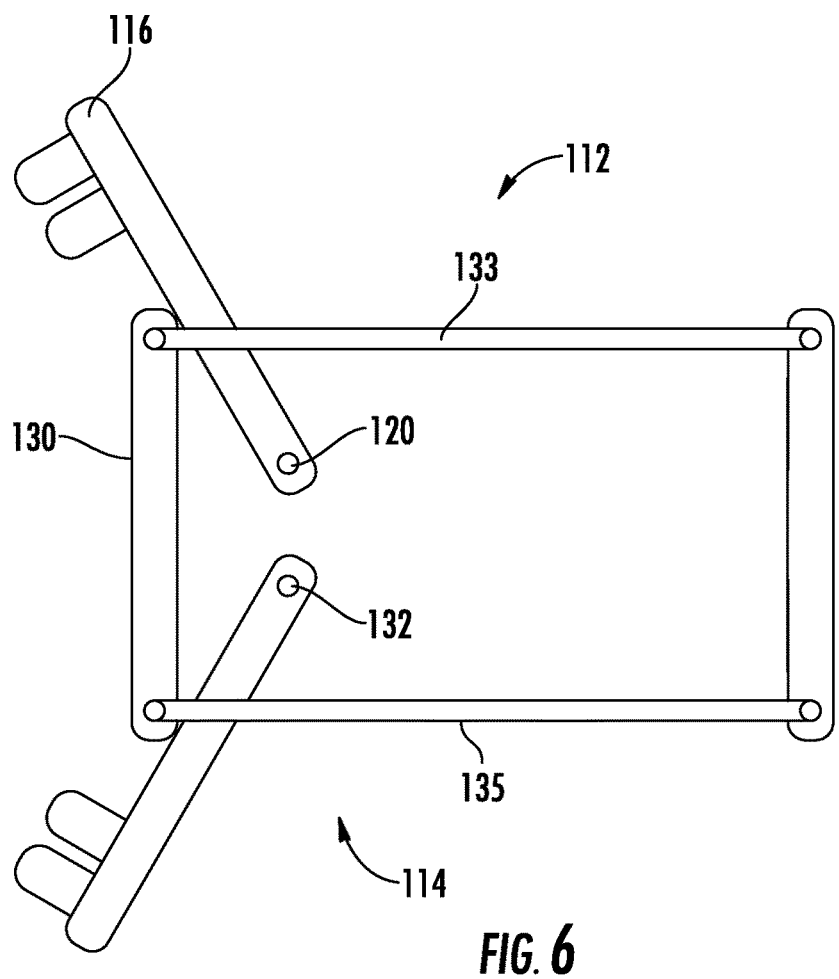
FIG. 6 is a diagrammatic top plan view of the vehicle shown in FIG. 5 in a final or fired position.

Alternatively, elastic bands may be stretched between two fixed points in relation to the frame 102. As shown in FIGS. 5 and 6, the bands 133, 135 are stretched from the stop 130 equidistantly to a point remote from the stop 130. The bands are located inward of the arms 116. The arms 116 may move to an initial or cocked position, shown in FIG. 5, wherein the bands are further stretched so that the arms 116 are loaded or ready to fire. Upon firing the arms 116, the bands move the arms 116 outward, in equal and opposite directions, in a circular motion, and then forward into contact with the stop 130, at a 120-degree forward angle, as shown in FIG. 6, wherein momentum of the arms 116 is transferred to the vehicle, causing the vehicle to move in a forward direction. After being fired, the arms 116 can be cocked and fired again.

An exemplary small-scale prototype vehicle weighs about one and one quarter pounds. Each arm has attached thereto four ounces of lead weight (i.e., four one-ounce bullet fishing weights), totaling eight ounces (one-half pound). Upon release of the arms, elastic bands (eleven for each arm) move the weighted arms from the initial cocked position into impact with the stop, causing movement of the one and one-quarter pound vehicle, 15-20 feet. With a minimal shove (representing the assist of a thrust motor), to reduce or eliminate the effects of the weight of the vehicle, the vehicle moves much farther, 50-55 feet.

Figure 7:
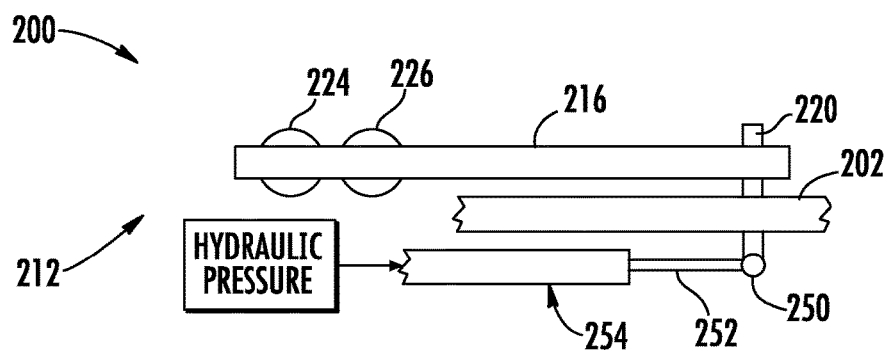
FIG. 7 is a diagrammatic side elevational detail view of a portion of a vehicle with another example of a device according to at least one further aspect of the invention.

It should also be appreciated that the invention may be implemented at any scale conceivable, including large-scale vehicles with suitable power sources. For example, it may be feasible to utilize hydraulic pressure to rotate impact generators corresponding to the impact generators 112, 114. FIG. 7 shows a vehicle 200, not shown in its entirety, which may substantially correspond to the wheeled vehicle 100 in function and apart from the following specific details, and which may correspond in structure. The vehicle 200 may have an impact generator 212 mounted to a frame 202 by an axle 220. The axle 220 may comprise a lever arm 250. In the view of FIG. 7, the lever arm 250 is seen only in end view, and will be understood to project in a direction towards the observer, although other directions may be suitable for carrying out the invention. A piston or ram 252 of a hydraulic cylinder 254 may engage the lever arm 250 and apply force developed by hydraulic pressure within the hydraulic cylinder 254 thereto. The hydraulic cylinder 254 is understood to comprise a hydraulic cylinder, wherein the piston 252 is reciprocatingly disposed within the hydraulic cylinder 254, and moves responsively to hydraulic pressure exerted on a fluid that has been introduced into the hydraulic cylinder 254. Pressure may be developed from a motor and pump combination, for example, or from a pressurized accumulator in another example (neither example is shown). A return feature functional to return the piston of the hydraulic cylinder 254, such as a return spring or an arrangement utilizing a fluid pressure pulse or signal (these options are not shown) may be incorporated into the system using the hydraulic cylinder 254.

The vehicle 200 may be different from the wheeled vehicle 100 in any number of ways. Whereas the wheeled vehicle 100 has been presented in uncomplicated terms merely to facilitate explanation of operating principles, it will be recognized that larger implementations of the invention, such as the vehicle 200, may offer utilitarian functions going beyond mere demonstration of operation as provided by the wheeled vehicle 100. In such larger implementations, the frame of the associated vehicle, such as the frame 202 of the vehicle 200, may comprise a chassis, frame, or body of a land vehicle, the hull of a boat, whether buoyant or capable of operating as a submarine, or even a fuselage or body of an aircraft that utilizes aerodynamic lift.

It should be appreciated that the arm 250 could be repeatedly returned back to the initial position, like the arm 116 shown in broken lines in FIG. 1, and moved to the final position, like the arm 116 shown in solid lines in FIG. 1.

Figure 8:
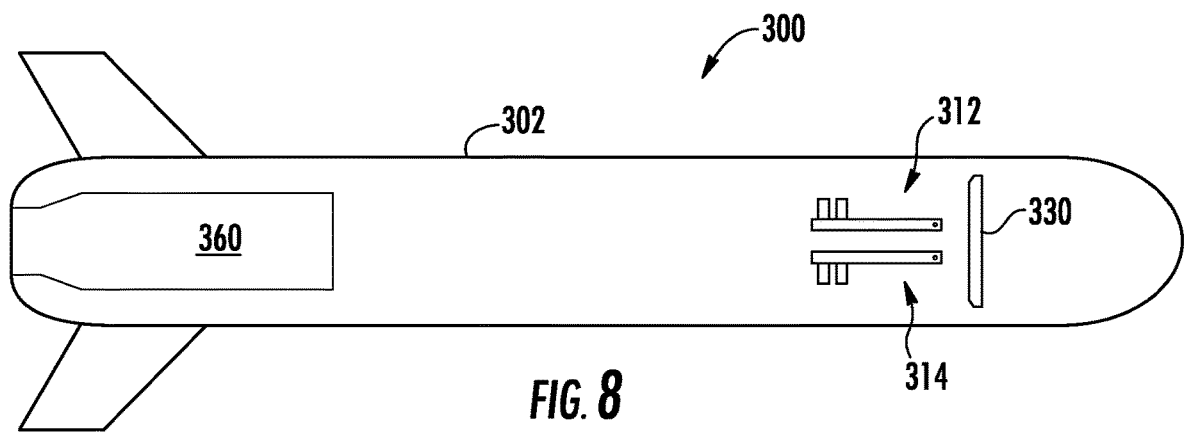
FIG. 8 is a diagrammatic top plan view of still another vehicle with a device according to at least one further aspect of the invention.

FIG. 8 shows an example of another implementation of the invention. A flight capable vehicle 300 may comprise a structurally sturdy platform or frame 302 to which is mounted a rocket or thrust motor 360 in addition to at least one pair of impact generators 312, 314. The thrust motor 360 may be a single thrust motor or may represent plural such motors, and is disposed to cause the vehicle 300 to fly or move through the atmosphere or space under its own power, although use of the term flight does not necessarily imply reliance on lift. Although not shown to the same degree of detail as the impact generators 112, 114 of FIG. 1, the impact generators 312, 314 will be understood to comprise corresponding structure as necessary to enable the impact generators to perform as described herein, and may be moved via hydraulic cylinders, such as the hydraulic cylinder 254 shown in FIG. 7. The impact generators 312, 314 are used in conjunction with one or more thrust motors 360. The impact generators 312, 314 are disposed to increase the velocity of the flight capable vehicle 300.

In this embodiment, force is provided by thrust of the thrust motor 360. The weight of the vehicle 300 provides resistance. There is no recoil. The thrust motor 360 is operable to give the vehicle initial velocity. More particular, it is operable to render the vehicle 300 airborne, and up to escape velocity (i.e., 25,000 mph), rendering the vehicle 300 weightless, or cancelling the weight factor (i.e., eliminating resistance caused by the weight of the vehicle 300), reducing the resistance of the impact of the impact generators 312, 314, which can impact the stop 330 at full force, so that the impact generators 312, 314 can be operated to increase the velocity beyond that of the thrust motor 360.

As stated above, the impact generators 312, 314 may be moved by hydraulic cylinders, like the hydraulic cylinder 254 shown in FIG. 7 and described above. Each hydraulic cylinder may be capable of producing tons of hydraulic pressure. The thrust exerted by the thrust motor 360 is measured in pounds per inch, and the thrust exerted by the impact generators 312, 314 is measured in tons per inch. The impact generators 312, 314, under a tremendous amount of hydraulic pressure, can push the vehicle 300 forward with a tremendous amount of force. For example, the pressure or force of a hydraulic cylinder can be in the order of 10 tons per square inch, or as high as 24,000 pounds, or 12 tons, per square inch, or even as high as 60,000 pounds, or 30 tons, per square inch. For purposes of example, using a low-end hydraulic cylinder, having a pressure of force in the order of 10 tons per square inch, in an area six inches long and ten inches deep, the resultant hydraulic force is 600 tons. An arm that is four feet in length, having a weight at the end there that is 1,000 pounds (i.e., one-half ton) will produce a tremendous centrifugal force, measured in tons, and resulting in an unprecedented velocity.

It should be clearly understood that the impact generators 312, 314 are intended to be moved with a tremendous amount of hydraulic force. The arms are moved in opposite directions of one another, out and around in a circular motion to impact the stop 330 (i.e., at a 120-degree angle with respect to each other) forward of the stop 330. Transfer momentum on impact with the stop 330 results in forward acceleration (i.e., in a direction forward of the impact), causing the vehicle 300 to accelerate in a forward direction, forward of the impact. The power source for moving the impact generators 312, 314 can be powered by electricity, which could be nuclear electricity. That is to say, the power source can be an electric hydraulic power source.

The present invention is susceptible to variations and modifications that may be introduced thereto without departing from the novel principles. For example, while the stop is depicted as a single member, individual corresponding stops (not shown) may be provided for each impact generator.

Also, the amount of swing or rotation of impact generators may vary from 120 degrees, being either more or less in magnitude. However, it should be appreciated that, with a suitable power source (e.g., hydraulic cylinders), a tremendous amount of centrifugal force (e.g., tons of centrifugal force) is generated by each opposing impact generator. The force of each impact generator is substantially equal and opposite to the force of the other impact generator. Upon impact of the impact generators with the stop, at an angle of about 120 degrees, which is a forward angle, measured between the impact generators, the force of momentum of the impact generators is transferred to the stop, and thus to the vehicle, in a forward direction, resulting in forward acceleration of the vehicle in a direction of impact, and with force much greater than the force of thrust motors.

It should be clear that the arms are initially moved straight out in opposite directions of one another, then out and around in a circular motion, only briefly, for 90 degrees out of 120 degrees of movement, and the force on the arms is tremendous, so that backward force on the frame, and thus recoil, is negligible. Recoil is limited to the 90-degree movement of the arms, then the arms, upon impact with the stop, force the vehicle forward, straight along a linear path, cancelling any recoil.

Further, it should be clear that, in the initial (i.e., cocked) position, the arms are side-by-side or parallel to each other, ready to be fired. When fired, simultaneously, the arms are fired off in equal and opposite directions to one another. Opposing forces cancel due to the weighted arms firing in opposite directions. Movement of the arms in a circular motion has the resultant effect of producing a unidirectional force. The impact of the arms with the stop at a 120-degree angle results in unidirectional force straight forward.

It should be clear that each arm moves 120 degrees, not 90 degrees, and not at a combined angle of 180 degrees. Although the 120-degree movement is preferred, it is conceivable that the movement can be some other angle, as long as the arm impacts the stop with a forward component of movement of the arms.

The instant invention converts circular motion, under an extreme amount of hydraulic pressure, resulting in an enormous amount of centrifugal force, into a straight linear force on impact of the arms with the stop. The instant invention may generate tremendous velocity by force of forward impacts of the arms.

Figure 9:
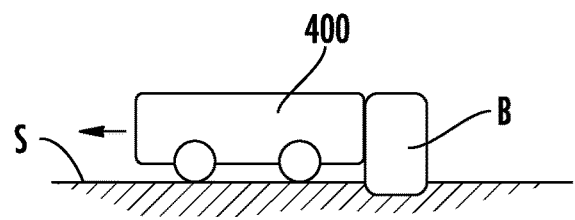
FIG. 9 is a diagrammatic side elevational view of a vehicle like that shown in FIG. 1 against a backstop.

It should be appreciated that the invention would be well suited to provide initial thrust or movement for a vehicle supported by a backstop, such as a structure sturdily fixed, or immobile, in relation to the environment in which the vehicle is operated. For example, as seen in FIG. 9, a land vehicle 400 could be supported for movement along a supporting surface S (i.e., a land surface), and supported rearward against the backstop B, which is immovable in relation to the surface. In such case, the vehicle 400 would sustain no rearward movement against or in the direction of the backstop B (i.e., to the right when viewing FIG. 9) upon movement of the impact generators in a forward direction. Upon impact of the impact generators with the stop, momentum of the impact generators would transfer to the vehicle 400, causing forward movement of the vehicle 400 (i.e., to the left when viewing FIG. 9).

Figure 10:
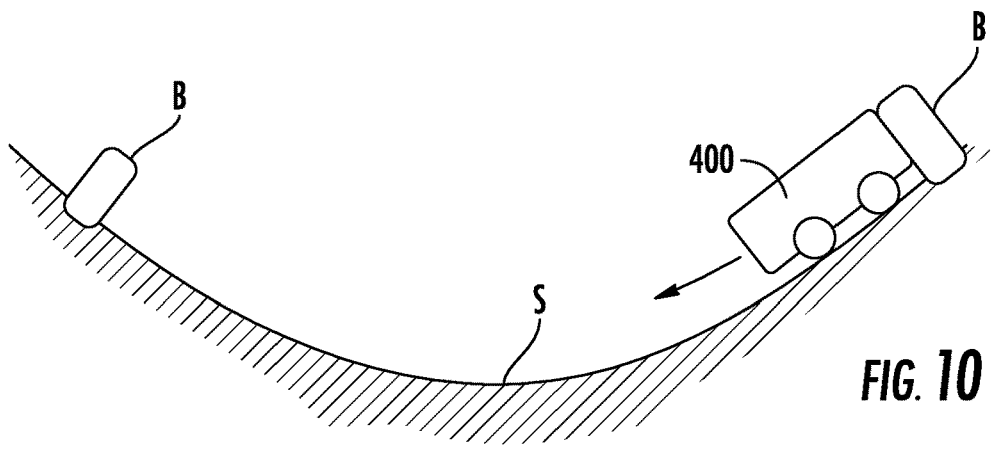
FIG. 10 is a diagrammatic side elevational view of another vehicle against a backstop with gravity assist.

It should be appreciated that such a land vehicle 400, as depicted in FIG. 9, could have many structural applications. For example, such a vehicle 400 configured to travel, non-stop, between two points, assisted by gravity, could benefit from the use of impact generators in combination with a backstop B, diagrammatically represented in FIG. 10. It is conceivable that such vehicle 400 could travel along an arcuate path, between two points, initially along a decline and ending along an incline, with substantially equivalent assent and descent, respectively, solely under the influence, or powered by impact generators transmitting force or momentum to the vehicle 400 against the backstop B, and assisted by gravity. This would cause forward movement of the vehicle 400 away from the backstop B at a descent along the decline and then ascending along the incline to a point of destination. A sub-terrain vehicle of this nature would be well suited in the mass transportation industry, for example, as a subway vehicle. Of course, it should be understood that this vehicle 400 could be equipped with a drive assembly, including a drive motor and suitable structure, for driving the wheels, in combination with the impact generators.

Figure 11:
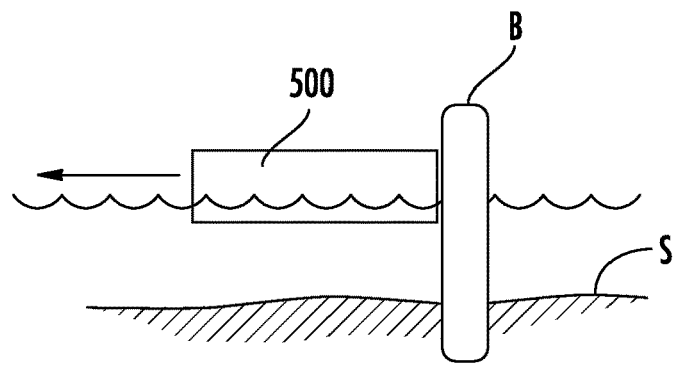
FIG. 11 is a diagrammatic side elevational view of yet another vehicle according to at least one further aspect of the invention against a backstop.

Similar operation would result with a boat, or other marine vessel. For example, a marine vessel 500 could be initially positioned against a backstop B, such as a pylon, which may be fixed in relation to a sub-surface S, beneath water supporting the vessel 500, as depicted in FIG. 11. Operation of the impact generators to engage a stop sturdily fixed in relation to the hull of the marine vessel 500 could transfer force or momentum from the impact generators to the stop, and in turn, to the vessel 500 to cause movement of the vessel 500 away from the backstop B (i.e., to the left when viewing FIG. 11).

This vehicle 500 likewise could be equipped with suitable structure to propel the vehicle 500, in combination with the impact generators.

Figure 12:
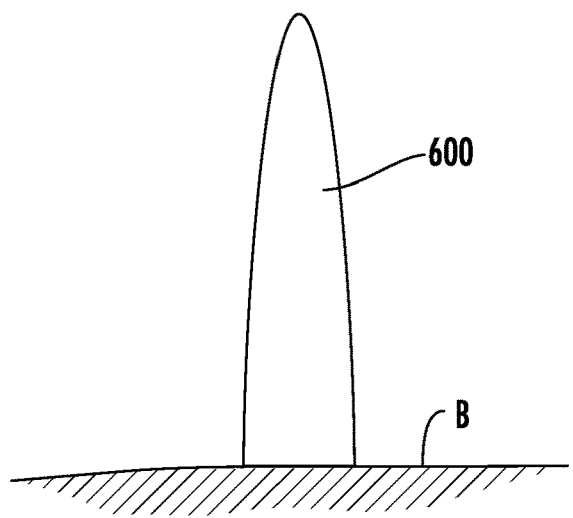
FIG. 12 is a diagrammatic side elevational view of still another vehicle according to at least one further aspect of the invention against a backstop.

Still, similar operation would result with an aircraft. As another example, as depicted in FIG. 12, a flight capable vehicle 600 supported against a backstop B, which is sturdily fixed, or immobile, in relation to the environment in which the vehicle 600 is being launch. The vehicle 600 would sustain no movement against or in the direction of the backstop B (i.e., downward when viewing FIG. 12) upon movement of the impact generators in a forward direction (i.e., upward when viewing FIG. 12). Upon impact of the impact generators with the stop, momentum of the impact generators would transfer to the vehicle 600, causing forward movement on the vehicle 600 (i.e., upward movement when viewing FIG. 12). An arrangement of such impact generators in combination with a backstop B could be useful in establishing initial lift of the vehicle 600, or when used in combination with a thrust motor, assisting with initial lift of the vehicle 600.

It should be clearly understood that the impact generators may be used in conjunction with a thrust motor. The thrust of the impact generators may be greater than that of a thrust motor.

It should also be understood that the velocity of the vehicle due to operation of the impact generators may exceed the velocity of the vehicle due to the thrust motor. That is to say, the vehicle may be operable at greater speeds and/or velocities with the impact generators than with a thrust motor alone. Additionally, acceleration of the vehicle due to the impact generators may be greater than that due to a thrust motor.

It is also possible that the vehicle could be configured so that force subjected to a vehicle due to movement of the power source and/or arms could be offset by calculated forward thrust of thrust motors. The instant invention has use in a flight capable vehicle, with increased thrust beyond that of thrust motors, to provide a flight capable vehicle that travels sufficiently faster than vehicles that accelerate to thousands, not hundreds, of miles per hour.

Figure 13:
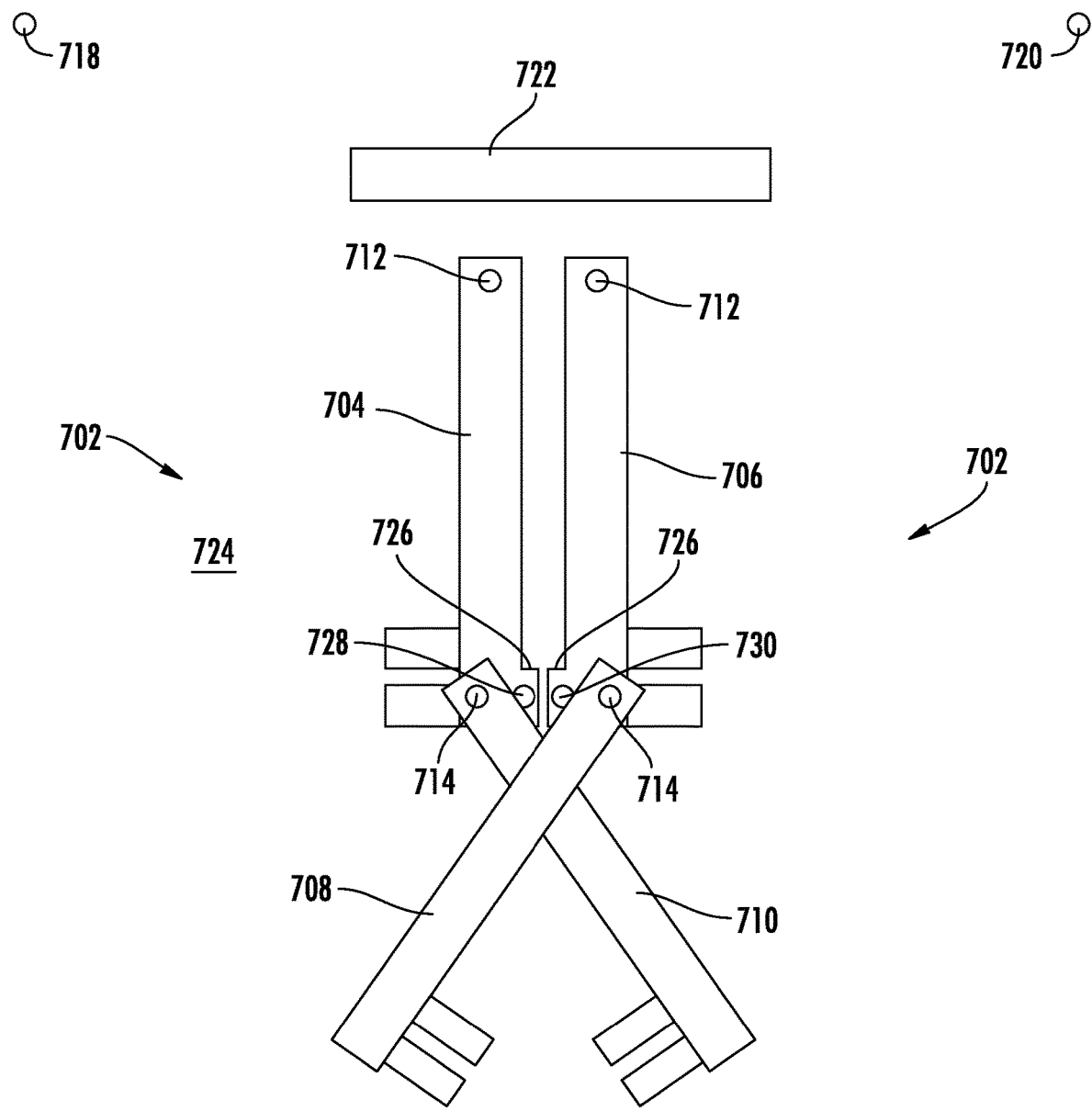
FIG. 13 is a diagrammatic top plan view of another vehicle with yet another example of a device according to at least one further aspect of the invention in an initial or cocked position.
Figure 14:
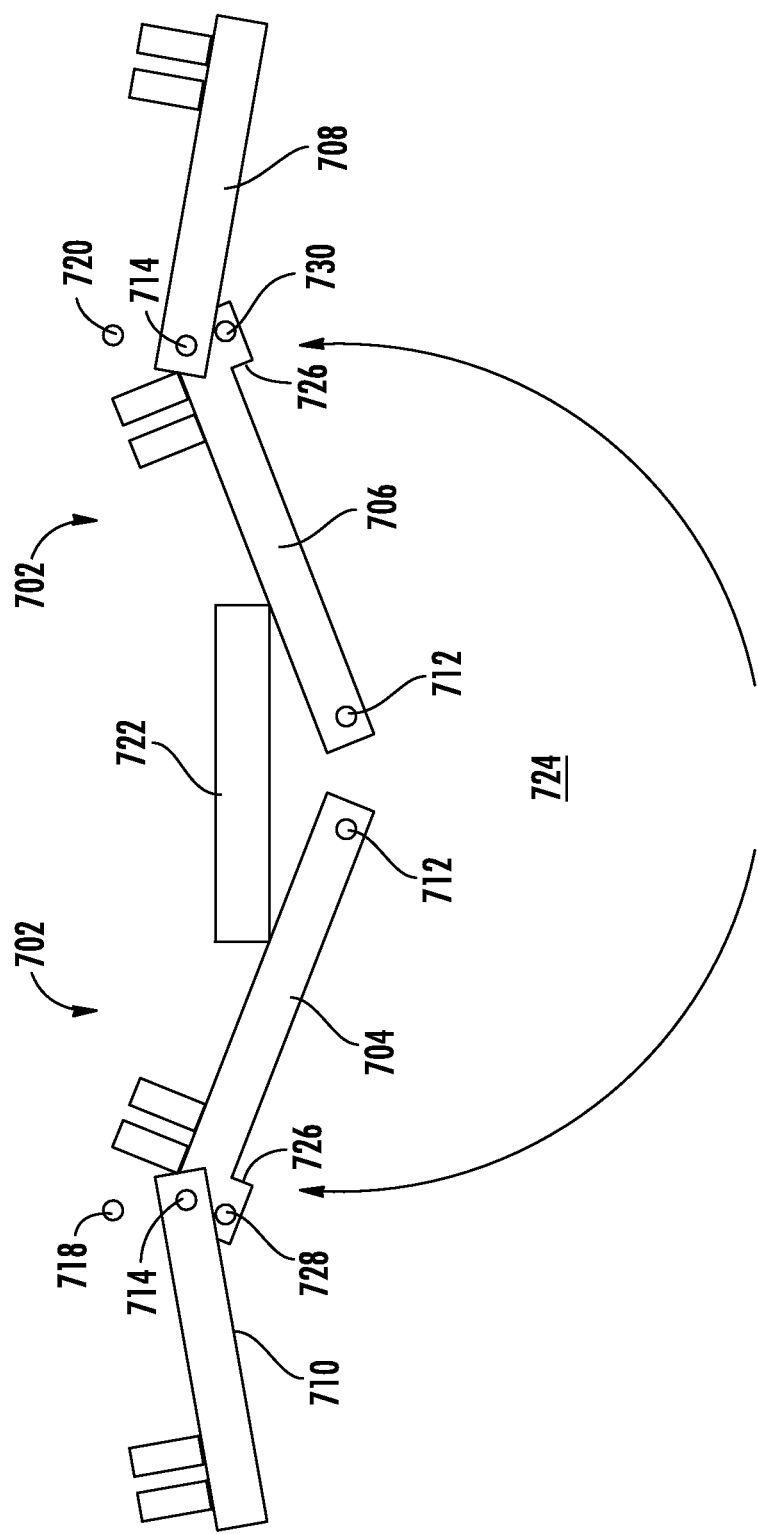
FIG. 14 is a diagrammatic top plan view of the vehicle shown in FIG. 13 with the device in an interim fired position.
Figure 15:
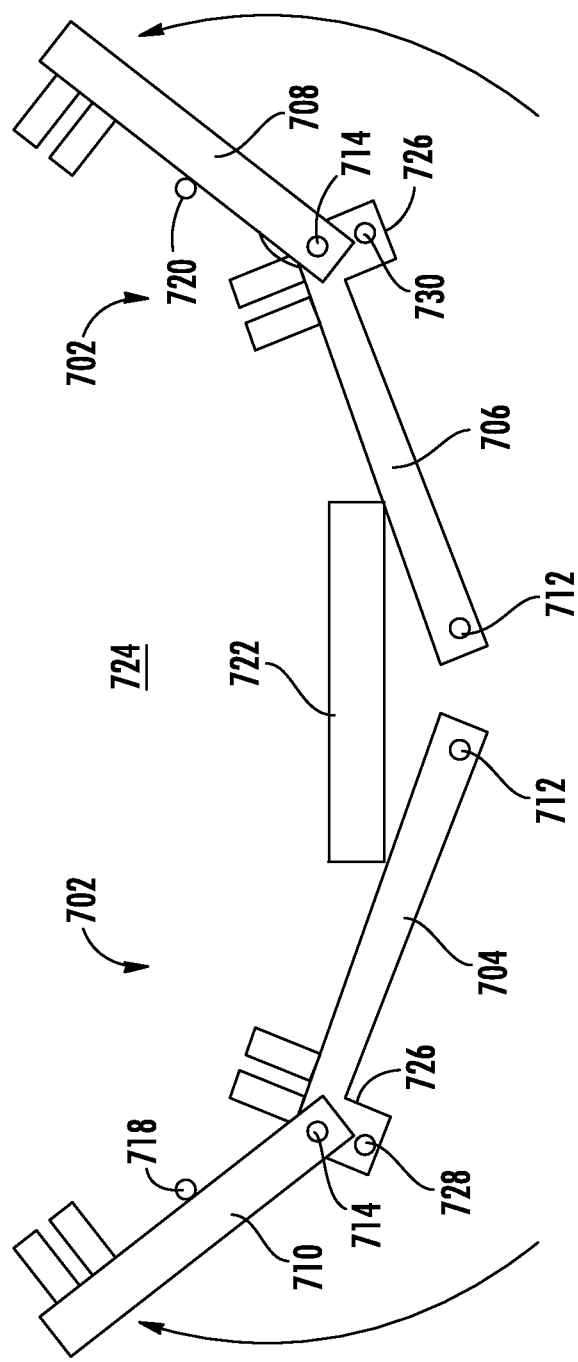
FIG. 15 is a diagrammatic top plan view of the vehicle shown in FIG. 13 with the device in a final fired position.

In another embodiment, shown in FIGS. 13-15, the impact generators 702 may be comprised of two inner or primary arms 704, 706 and two outer or secondary arms 708, 710, with two stages of operation. Each of the primary arms 704, 706 may be mounted to the frame 724 for pivotal movement at respective primary pivot axes 712, and each of the secondary arms 708, 710 may be connected to a respective primary arm 704, 706 for pivotal movement at respective pivot axes 714. Each secondary arm 708, 710 may move rotationally about its respective pivot axes 714 to provide added momentum to the impact generators 702. Additionally, there may be two outer or secondary stops 718, 720 located laterally outward from an inner or primary stop 722. During a first stage of operation, the primary stop 722 may intercept the primary arms 704, 706, as shown in FIG. 14, causing a transfer of an initial momentum of the impact generators 702 to the frame 724. As the primary arms 704, 706 of the impact generators 702 are arrested by the primary stop 722, each of the two secondary arms 708, 710, during a second stage of operation, may continue to swing forward about its respective secondary pivot axes 714, as shown in FIG. 15. Each of the two secondary stops 718, 720 then may intercept each of the respective secondary arms 708, 710, and transfer the additional momentum of the impact generators 702 to the frame 724.

Figure 16:
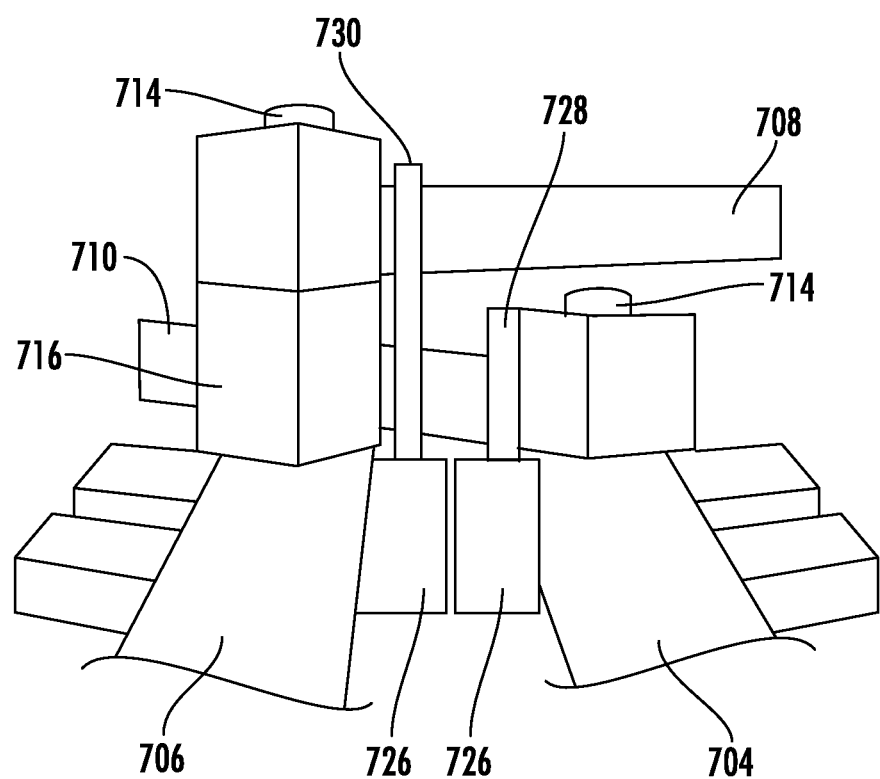
FIG. 16 is a diagrammatic side elevational detail view of a portion of the vehicle shown in FIG. 13, and particularly, showing a spacer, which permits secondary arms to overlap when in an initial or cocker position.

The secondary arms 708, 710 may be connected directly to the primary arms 704, 706 at the pivot axes 702. Alternatively, one secondary arm 710 may be separated from its respective primary arm 706 by a spacer 716, shown in FIG. 16. The spacer 716 raises the secondary arm 708, allowing the secondary arm 708 to pass over and thus overlap the other secondary arm 710 when in the impact generators 702 are in an initial or cocked position, which may be referred to as a pre-loaded condition, as shown in FIG. 13.

The angular movement of the secondary arms 708, 710 is preferably about 45 degrees from the initial or cocked position to the point that the secondary arms 708, 710 are intercepted by the secondary stops 718, 720 (i.e., the point of impact), although other angular movements may be suitable for carrying out the invention. The overlapping arrangement of the secondary arms 708, 710, mentioned above, may result in an increased angular movement of the secondary arms 708, 710, or increased greater pre-loading of the secondary arms 708, 710.

Free ends of the primary arms 704, 706 may be provided with primary abutment members 726, which abut one another when the primary arms 704, 706 are in the initial or cocked position. The primary abutment members 726 function to position the primary arms 704, 706 substantially parallel to one another when in the initial or cocked position, as shown in FIG. 13.

The primary abutment members 726 may support secondary abutment members 728, 730 which may be in the form of pins that are fixed to and extend upward from the primary abutment members 726. The secondary abutment members 728 limit the rotational movement of the secondary arms 708, 710 in relation to the primary arms 704, 706, in the initial or cocker position. That is to say, the secondary abutment members 728 may limit the pre-loading of the secondary arms 708, 710.

In the illustrated embodiment, the secondary arms 708, 710 are shorter in length than that of the primary arms 704, 706. However, it should be appreciated that other lengths may be suitable for carrying out the inventions.

It should be appreciated that the primary and secondary arms 704, 706 and 708, 710 may be weighted in a manner similar to the arms 116 described above.

The principals of the operation are similar to those described above. However, it should be appreciated that the secondary arms 708, 710 provide a much greater impact force than that provided by the primary arms 704, 706 alone.

In accordance with the provisions of the patent statutes, the principle and mode of operation of this invention have been explained and illustrated in its preferred embodiment. However, it must be understood that this invention maybe practiced otherwise than as specifically explained and illustrated without departing from its spirit or scope.

What is claimed is:

1. A device capable of moving and being accelerated, comprising:
   a frame;
   a plurality of impact generators each of which is mounted to the frame and is disposed to move rotationally about an axis, each one of the plurality of impact generators comprising at least two primary arms and at least two secondary arms, wherein each of the primary arms is mounted for rotational movement to the frame about a primary pivot axes and each of the secondary arms is connected for rotational movement to a respective one of the primary arms at a secondary pivot axes;
   at least one stop for intercepting each of the impact generators, wherein the stop is fixed to the frame and is disposed to interfere with the impact generators, to arrest rotational movement of each one of the respective impact generators about the respective axis of the respective impact generator, and to transmit momentum from the impact generator to the frame; and
   a power source disposed to rotate the impact generators about their respective axes, wherein when the impact generators intercept the stops and are stopped by the stops, momentum of the formerly moving impact generators is transferred to the frame through the stops, and the frame accelerates responsively to the transfer of momentum,
   at least one thrust motor, wherein the vehicle is configured so that force subjected to a vehicle due to movement of the power source and primary and secondary arms is offset by a calculated forward thrust of the at least one thrust motor.

2. The device of claim 1, wherein the impact generators are disposed in pairs each of which rotates about its respective axis in a direction opposite that of the other impact generator of the pair.

3. The device of claim 1, wherein force is applied to the impact generators by the power source, further comprising a release disposed to free the impact generators to rotate about their respective axes responsive to the force applied by the power source.

4. The device of claim 1, wherein the power source applies hydraulic pressure to the impact generators.

5. The device of claim 1, wherein the frame comprises a plurality of wheels enabling the device to roll along an environmental surface, and the impact generators are disposed to rotate through a plane that is parallel to the frame.

6. The device of claim 1, wherein each one of the impact generators comprises an arm having a proximal end rotatably fixed to rotate about its respective axis, and a weighted distal end.

7. The device of claim 1, wherein the vehicle is a flight capable vehicle.

8. The device according to claim 1, wherein the primary arm of each of the plurality of impact generators has a proximal end that is mounted to the frame in a manner enabling the arm to move rotationally about the axis about 120 degrees between an initial position and a final position.

9. The device of claim 1, wherein the at least one stop is one of a plurality of stops comprising at least one primary stop and at least one secondary stop.

10. The device of claim 9, wherein the primary stop intercepts the primary arms, and the secondary stop intercepts the secondary arms.

11. A device capable of moving and being accelerated, comprising:
 a frame;
 a plurality of impact generators each of which is mounted to the frame and is disposed to move rotationally about an axis, each one of the plurality of impact generators comprising at least two primary arms and at least two secondary arms, wherein each of the primary arms is mounted for rotational movement to the frame about a primary pivot axes and each of the secondary arms is connected for rotational movement to a respective one of the primary arms at a secondary pivot axes;
 at least one stop for intercepting each of the impact generators, wherein the stop is fixed to the frame and is disposed to interfere with the impact generators, to arrest rotational movement of each one of the respective impact generators about the respective axis of the respective impact generator, and to transmit momentum from the impact generator to the frame; and
 a power source disposed to rotate the impact generators about their respective axes, wherein when the impact generators intercept the stops and are stopped by the stops, momentum of the formerly moving impact generators is transferred to the frame through the stops, and the frame accelerates responsively to the transfer of momentum,
 a backstop, wherein the frame is initially supported by the backstop, which is fixed, or immobile, in relation to an environment in which the frame is moved.

* * * * *